(12) United States Patent
Morino

(10) Patent No.: US 8,553,104 B2
(45) Date of Patent: *Oct. 8, 2013

(54) IMAGE CAPTURE DEVICE

(71) Applicant: Canon Kabushiki Kaisha, Tokyo (JP)

(72) Inventor: Takashi Morino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,001

(22) Filed: Dec. 27, 2012

(65) Prior Publication Data

US 2013/0113947 A1 May 9, 2013

Related U.S. Application Data

(60) Division of application No. 13/198,604, filed on Aug. 4, 2011, now abandoned, which is a continuation of application No. 12/564,837, filed on Sep. 22, 2009, now Pat. No. 8,026,958, which is a continuation of application No. 11/208,513, filed on Aug. 22, 2005, now Pat. No. 7,612,807.

(30) Foreign Application Priority Data

Sep. 14, 2004 (JP) .................................. 2004-266898

(51) Int. Cl.
H04N 5/76 (2006.01)

(52) U.S. Cl.
USPC ...................................... 348/231.2; 348/231.9

(58) Field of Classification Search
USPC .......... 348/207.99, 211.1, 211.3, 31.2, 231.6, 348/231.9; 710/17, 29, 31, 33, 38, 60; 455/556.1, 556.2, 572
See application file for complete search history.

(56) References Cited

U.S. PATENT DOCUMENTS 8,026,958 B2 * 9/2011 Morino ..................... 348/231.2
2003/0011704 A1 * 1/2003 Sawachi ...................... 348/372
2004/0041538 A1 * 3/2004 Sklovsky ..................... 320/127

* cited by examiner

Primary Examiner — Lin Ye
Assistant Examiner — Euel Cowan
(74) Attorney, Agent, or Firm — Canon USA Inc IP Division

(57) ABSTRACT

An image capture device has a first image transfer method for storing a captured digital image on a storage medium and transferring the digital image to a communication device, and a second image transfer method for storing the digital image on the storage medium, reading the digital image from the storage medium and then transferring the digital image to the communication device. The first image transfer method or the second image transfer method is manually or automatically set.

38 Claims, 5 Drawing Sheets

IMAGE CAPTURE DEVICE

CROSS-REFERENCE TO RELATED APPLICATIONS

The present application is a divisional application pursuant to 37 CFR §1.53(b) of U.S. patent application Ser. No. 13/198,604 filed on Aug. 4, 2011, which is a continuation of U.S. patent application Ser. No. 12/564,837 filed on Sep. 22, 2009 and now U.S. Pat. No. 8,026,958, which is a continuation of U.S. patent application Ser. No. 11/208,513 filed on Aug. 22, 2005 and now U.S. Pat. No. 7,612,807, which claims the benefit of Japanese Patent Application No. 2004-266898 filed on Sep. 14, 2004, all of which hereby incorporated by reference herein in their entirety.

BACKGROUND OF THE INVENTION

1. Field of the Invention

The present invention relates to an image capture device such as a digital camera and digital video camera.

2. Description of the Related Art

In recent years digital cameras have a function to store a captured digital image on a storage medium such as memory card as well as a function to transfer the captured digital image to an another device via a network interface which is based on IEEE1394 serial bus, USB (universal serial bus), and the like. For example, Japanese Laid-Open Patent Application No. 2003-283900 discloses a digital camera that transfers the captured digital image to a file server via a wireless LAN card.

The digital camera disclosed in Japanese Laid-Open Patent Application No. 2003-283900 can be provided with either one of the memory card or the wireless LAN card to be connected thereto, such that the digital image captured by the digital camera cannot be transferred to the file server on the network via a communication device such as wireless LAN card when the digital image captured by the digital camera is stored on the storage medium such as memory card.

In addition, Japanese Laid-Open Patent Application No. 2003-283900 does not disclose a plurality of methods available in transferring the digital image captured by the digital camera to the communication device such as wireless LAN card while storing the digital image captured by the digital camera on the storage medium such as memory card. In addition, Japanese Laid-Open Patent Application No. 2003-283900 does not disclose a method to select these methods by the user's setup or to select these methods automatically.

SUMMARY OF THE INVENTION

The present invention is to overcome the above-described drawbacks. For example, the present invention enables an image transfer method to be set by a user or automatically selected for storing a digital image captured by a digital camera on a storage medium such as a memory card and transferring the digital image to a communication device such as a wireless LAN card.

According to an aspect of the present invention, an image capture device includes a first image transfer method for storing a captured digital image on a storage medium and transferring the digital image to a communication device, a second image transfer method for storing the digital image on the storage medium, reading the digital image from the storage medium and then transferring the digital image to the communication device, and an operation unit adapted to turn on at least one of the first image transfer method and the second image transfer method.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
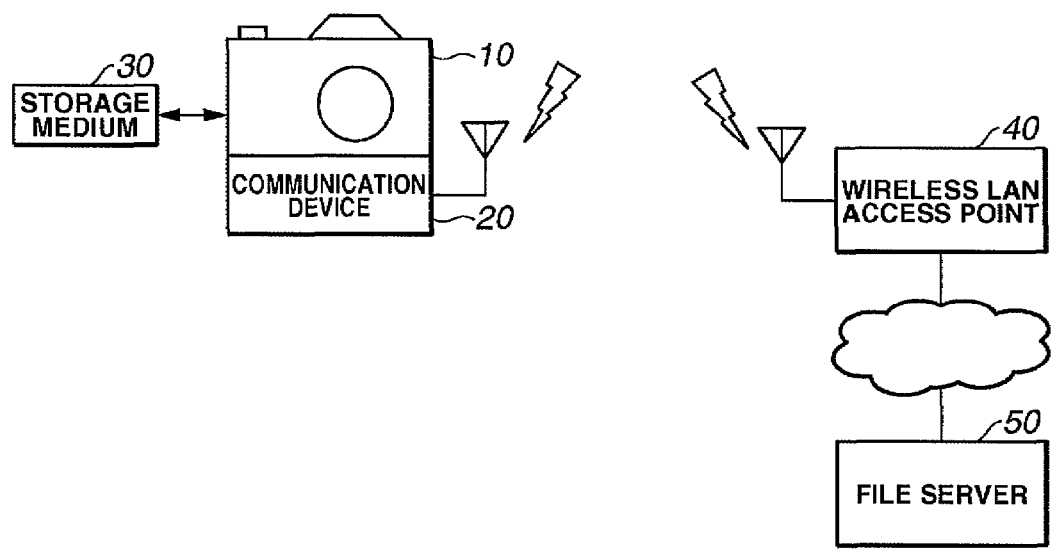
FIG. 1 is a drawing showing one example of an image capture system in accordance with a first embodiment of the present invention.

To begin with, one example of the image capture system in accordance with the first embodiment of the present invention is explained with reference to FIG. 1.

An image capture device 10 is a digital camera or a device operable as a digital camera (such as digital video camera).

The image capture device 10 has two image transfer methods. A first image transfer method concurrently carries out a process of reading from a buffer memory (not shown) inside the image capture device 10 and storing on a storage media 30, an image file that includes the captured digital image and its auxiliary information, and a process of transferring the image file from the buffer memory inside the image capture device 10 to a communication device 20. A second image transfer method carries out a process of reading the image file, that includes the captured digital image and its auxiliary information, from the buffer memory inside the image capture device 10, and storing the image file on the storage medium 30, followed by a process of reading the image file from the storage media 30 and transferring the file to the communication device 20. The first image transfer method, as compared to the second image transfer method, gives a priority to a transfer of the captured image to the communication device. The second image transfer method, as compared to the first image transfer method, gives a priority to storage of the captured image to the storage medium 30. According to the first embodiment, these image transfer methods can be set by a user or can be automatically selected.

In addition, the image capture device 10 has a power ON mode and a power save mode. The power ON mode is an operational mode in which all functions of the image capture device 10 can be used. If a power source of the image capture device 10 is ON, the image capture device 10 is placed in the power ON mode. The power save mode is an operational mode having lower power consumption than the power ON mode. While operating in the power save mode, only a part of the functions of the image capture device 10 can be used. If a user does not manipulate the image capture device 10 during a first predetermined period, the image capture device 10 automatically enters the power save mode. If a user does not manipulate the image capture device during a second predetermined period, starting when the power save mode is ON, the image capture device 10 automatically turns OFF the power source of the image capture device 10. Moreover, if the user manipulates the image capture device 10 during the second predetermined period starting when the power save mode is ON, the image capture device 10 automatically turns OFF the power save mode and returns to the power ON mode. The second predetermined period may either be the same as or longer than the first predetermined period.

The communication device 20 transfers an image file, transferred from the image capture device 10 to the communication device 20, to a file server 50 via a wireless LAN access point 40 (hereinafter referred to as AP 40), which is based on IEEE802.11a, IEEE802,11b, IEEE802.11g, and the like. The communication protocol for this invention is not limited to these examples, and any protocol that would enable practice of the present invention is applicable.

The communication device 20 has the power ON mode and the power save mode. The power ON mode is an operational mode that can use all functions of the communication device 20. If a power source of the communication device 20 is ON, the communication device 20 is placed in the power ON mode. The power save mode is an operational mode having lower power consumption than the power ON mode. While operating in the power save mode, only a part of the functions of the communication device 20 can be used. When a predetermined time is elapsed after the transfer of an image file is finished, the communication device 20 automatically enters the power save mode. If the communication device 20 detects that the image capture device 10 has entered the power save mode, it also enters the power save mode. If the communication device 20 detects that the image capture device 10 has entered the power ON mode, it also returns to the power ON mode.

The communication devices 20 may be connected to the image capture device 10 via the network interface based on IEEE1394 serial bus, USB (universal serial bus), and the like, or connected to an interface for establishing connection with the storage medium 30, or housed in the image capture device 10. The method of connecting the communication device 20 and the image capture device 10 is not limited to these examples, and any method that would allow practice of the present invention is applicable. In the case of the first embodiment, the communication device 20 and the image capture device 10 are connected via the network interface which is based on IEEE1394 serial bus, USB, and the like.

Further, the communication devices 20 may receive the power supply from a battery connected to the communication device 20, or receive the power supply from the image capture device 10. In the case of the first embodiment, the communication device 20 receives the power supply from the battery connected to the communication device 20.

The storage medium 30 is a storage medium such as memory card (card-shaped storage medium with built-in non-volatile memory), or hard disk device. The storage medium 30 can be attached to and detached from the image capture device 10.

Figure 2:
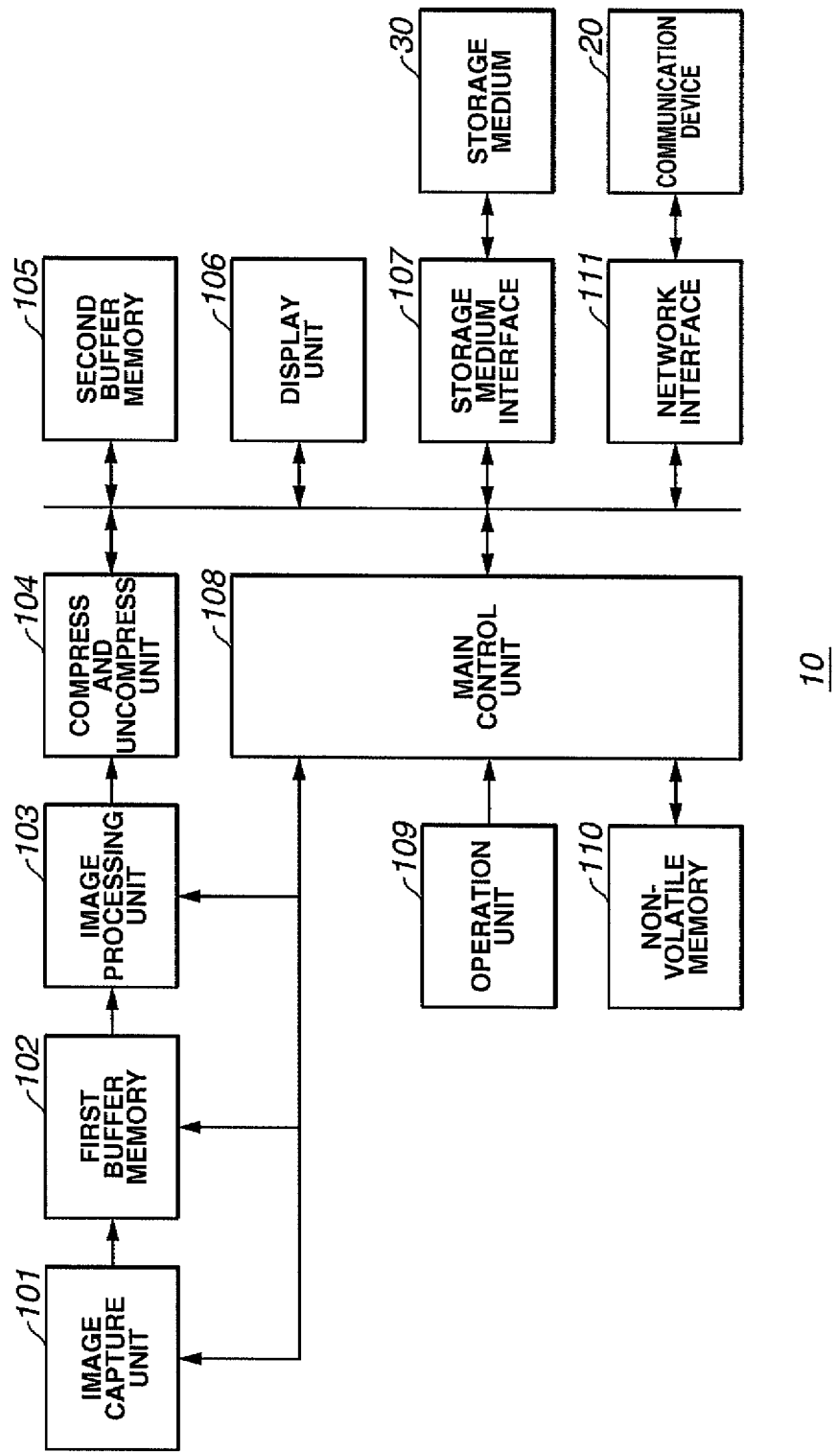
FIG. 2 is a drawing showing one example of an image capture device in accordance with the first embodiment of the present invention.

Next, one example of the configuration of the image capture device 10 is explained with reference to FIG. 2.

When a shutter button (not shown) on the image capture device 10 is fully pressed, an image capture unit 101 converts a light received by an image capture element (not shown), such as CCD image sensor or CMOS image sensor, to electrical signals. The electrical signals are digitalized to generate a digital image, and the digital image thus generated is stored on a first buffer memory 102. If the shutter button continues to be fully pressed, the image capture unit 101 continues shooting digital images until the first buffer memory 102 is full. The first buffer memory 102 has a capacity to store a plurality of digital images.

An image processing unit 103 reads a digital image from the first buffer memory 102, and implements a development process of the digital image. The development process includes the adjustments of white balance, sharpness, contrast, color space, resolution, and the like. The development process can be set by the user.

A compress and uncompress unit 104 has a function to compress a digital image processed at the image processing unit 103 by an image compression method such as JPEG, JPEG2000, and the like, and a function to uncompress a digital image thus compressed. A compression rate can be set by the user.

A main control unit 108 has a microcomputer that controls the image capture device 10 according to a control program contained in a non-volatile memory 110. The main control unit 108 has a function to generate an image file including the digital image compressed by the compress and uncompress unit 104 and information auxiliary to the digital image, and a function to store the generated image file in the second buffer memory 105. The auxiliary information includes information related to the digital image, information related to the image capture device 10, thumbnail of the digital image, and the like. The second buffer memory 105 has a capacity to store a plurality of image files. The main control unit 108 has a function to change the operational mode of the image capture device 10 to the power ON mode or the power save mode.

A display unit 106 includes a display such as a liquid crystal display for displaying various information. More specifically, the display unit 106 has a function to display information related to the image capture device 10, a function to display a reduced image of the captured digital image, and a function to display a reduced image of the digital image stored in the storage medium 30. The information displayed is not limited to these examples, and any information to be displayed that would enable practice of the present invention is applicable. In case of displaying the reduced image of the digital image stored on the storage medium 30, information related to the digital image can also be displayed. The display unit 106 has a function to provide a graphical user interface such as setup menu.

A storage medium interface 107 has a function to write an image file stored in the second buffer memory 105 on the storage medium 30, and a function to read an image file stored on the storage medium 30 from the storage medium 30 and write the image file to the second buffer memory 105.

An operation unit 109 is a user interface for operating the image capture device 10, and is provided with a power switch to turn ON or turn OFF the power source of the image capture device 10, a shutter button to give an instruction to start photographing, a menu button to display the setup menu on the display unit 106, a cross button to shift up/down and right/left a cursor displayed on the display unit 106, a select button to select items or images selected by the cursor, and the like. The shutter button can be pressed halfway or fully. When the shutter button is pressed halfway, the image capture device 10 executes AF, AE, and the like. When the shutter button is fully pressed, the image capture device 10 executes photographing of the digital image.

The non-volatile memory 110 stores a control program that controls the image capture device 10, information related to the image capture device 10, and the like. Moreover, the non-volatile memory 110 stores information related to the AP 40, information related to the file server 50 (such as IP address), and the like. Further, the non-volatile memory 110 also stores an image data of the setup menu to be displayed on the display unit 106.

A network interface 111 is based on IEEE1394 serial bus, USB, and the like, and transfers an image file stored in the second buffer memory 105 to the communication device 20. Moreover, the network interface 111 transfers to the communication device 20 the information related to the image capture device 10, the information related to the AP 40, the information related to the file server 50, and the like.

Figure 5:
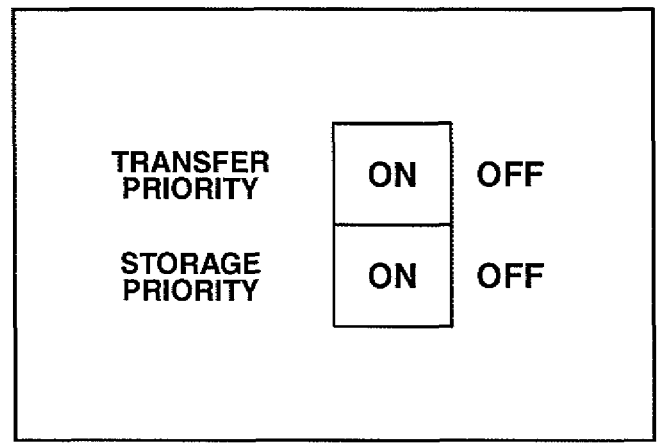
FIG. 5 is a drawing showing one example of a setup menu for setting the first and second image transfer methods to ON or OFF.

Next, a procedure for setting the first and second image transfer methods to ON or OFF is explained with reference to FIG. 5. FIG. 5 is a drawing showing one example of the setup menu to set the first and second image transfer methods to ON or OFF. In the first embodiment, the setup menu shown in FIG. 5 is displayed on the display unit 106 by operating the cross button and the menu button of the operation unit 109.

"Transfer priority" shown in FIG. 5 corresponds to the first image transfer method. "Storage priority" shown in FIG. 5 corresponds to the second image transfer method. The user can operate the cross button and select button to set the "transfer priority" and "storage priority" to ON or OFF. The example of FIG. 5 illustrates the case where "transfer priority" and "storage priority" are set to ON.

Figure 3:
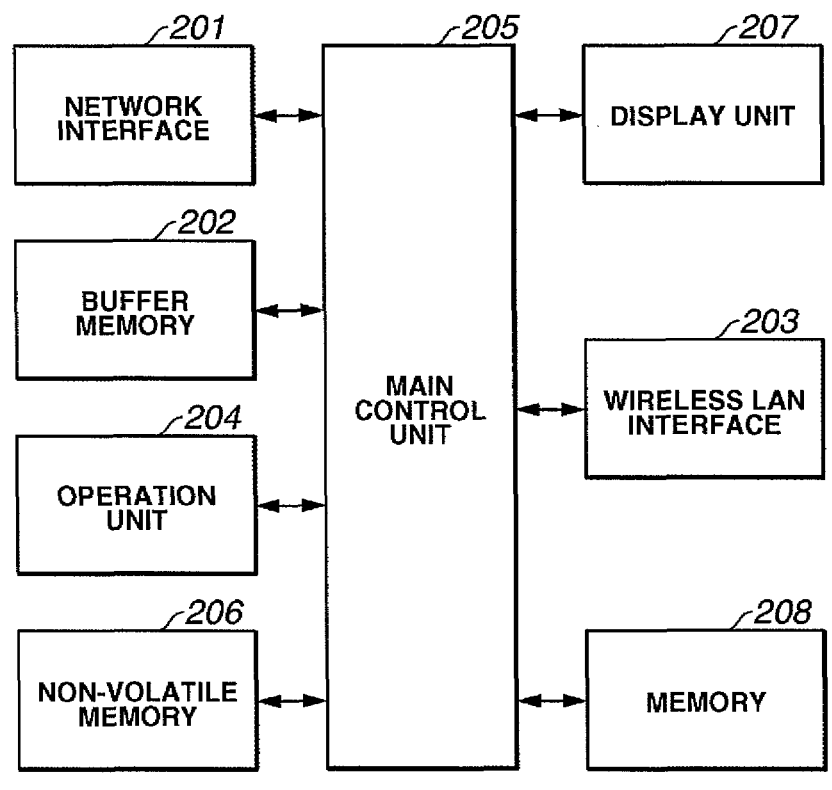
FIG. 3 is a drawing showing one example of a communication device in accordance with the first embodiment of the present invention.

Next, one example of the communication device 20 is explained with reference to FIG. 3.

A network interface 201 is based on IEEE1394 serial bus, USB, and the like, and receives an image file transferred from the image capture device 10 to the communication device 20. The image file received by the network interface 201 is stored in a buffer memory 202, and has a capacity to store a plurality of image files. The buffer memory 202 receives the information related to the image capture device 10, the information related to the AP 40, the information related to the file server 50, and the like, from the image capture device 10.

A wireless LAN interface 203 transfers an image file stored in the buffer memory 202 to the file server 50 via the AP 40.

An operation unit 204 is a user interface to operate the communication device 20, and has a switch to turn ON or OFF the power source of the communication device 20, and the like.

A main control unit 205 has a microcomputer that controls the communication device 20 according to a control program contained in a non-volatile memory 206. The main control unit 205 has a function to detect the operational mode of the image capture device 10 and a function to change the operational mode of the communication device 20 to power ON mode or the power save mode depending on the operational mode of the image capture device 10.

The non-volatile memory 206 stores the control program that controls the communication device 20. Moreover, the non-volatile memory 206 stores the information related to the communication device 20, the information related to the image capture device 10, the information related to the AP 40, the information related to the file server 50, and the like. Further, the information related to the image capture device 10, the information related to the AP 40, and the information related to the file server 50 are received from the image capture device 10 and stored in the non-volatile memory 206.

A display unit 207 includes a display such as a liquid crystal display for displaying various information. More specifically, the display unit 207 has a function to display information indicating whether the communication is in progress, a function to display information indicating the current transfer rate, information indicating the current communication status, information indicating the error, information indicating the remaining amount of charge of a battery of the communication device 20, and the like. The main control unit 205 turns OFF the display unit 207 when the power save mode is ON.

A memory 208 is the memory that registers information indicating a channel in which the AP 40 has been detected. The information registered in the memory 208 is deleted when the power source of the communication device 20 is OFF.

Figure 4:
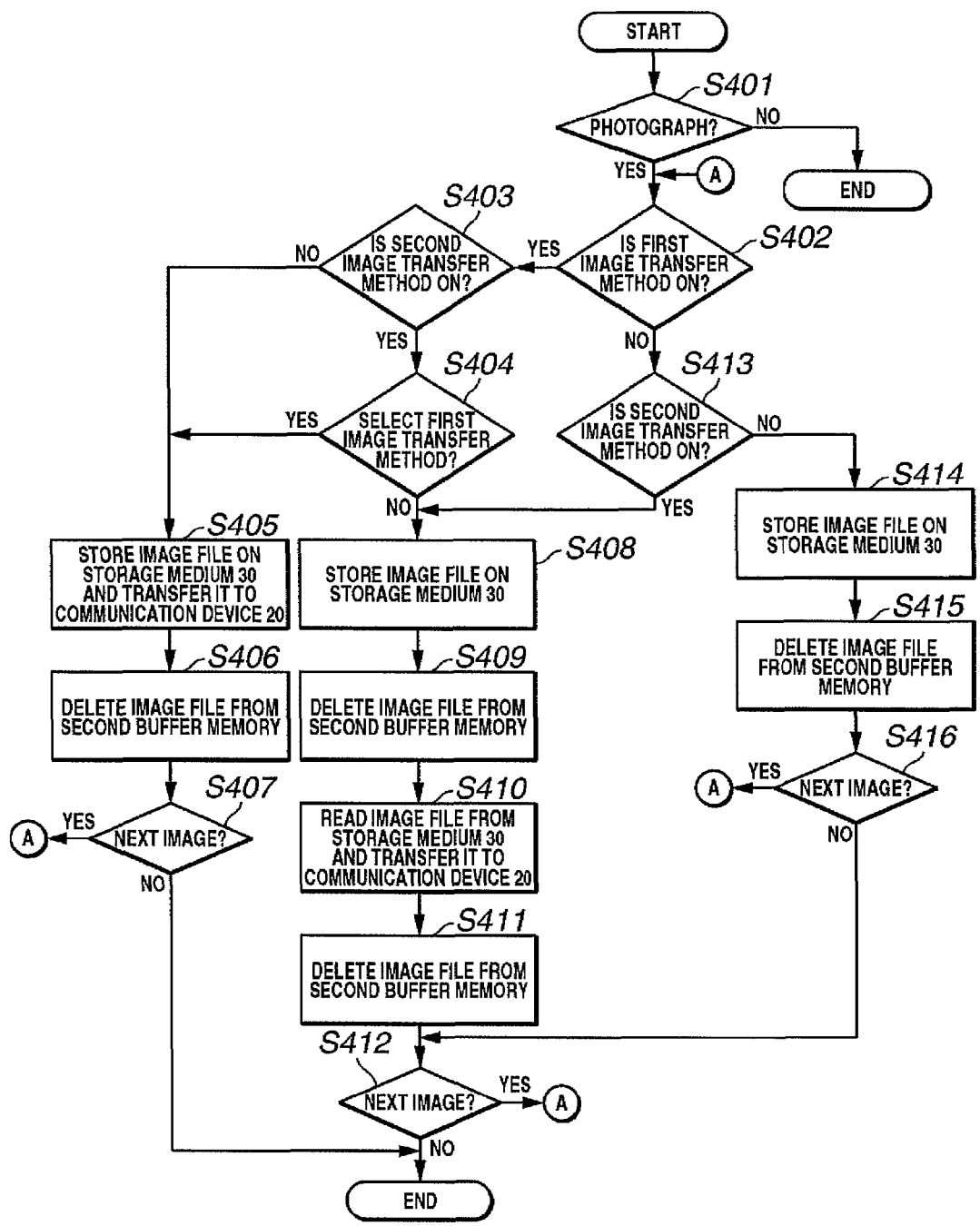
FIG. 4 is a flow chart illustrating one example of a process executed at the image capture device.

Next, one example of a procedure of the process executed at the image capture device 10 is explained with reference to FIG. 4. The process shown in FIG. 4 starts when the image capture device 10 and the communication device 20 are in the power ON mode and when the communication with the communication device 20 is possible. The process shown in FIG. 4 is controlled by the main control unit 108 according to the control program contained in the non-volatile memory 110.

In step S401, the main control unit 108 decides whether the shutter button of the operation unit 109 is fully pressed. The process advances to step S402 when the shutter button is fully pressed. The process according to the flow chart ends when the shutter button is not fully pressed. If the shutter button continues to be fully pressed down, the image capture device 10 continues shooting the digital images until the first buffer memory 102 is full. Further, the image capture device 10 generates the image file from each digital image stored in the first buffer memory 102 and stores these image files in the second buffer memory 105.

In step S402, the main control unit 108 decides whether the first image transfer method is ON. The process advances to step S403 when the first image transfer method is ON. The process advances to step S413 when the first transfer method is OFF.

In step S403, the main control unit 108 decides whether the second image transfer method is ON. The process advances to step S404 when the second image transfer method is ON. The process advances to step S405 when the second image transfer method is OFF.

In step S404, the main control unit 108 decides whether to select the first image transfer method depending on a free space of the buffer memory 202 inside the communication device 20. In the first embodiment, the communication device 20 notifies the image capture device 10 whether the free space of the buffer memory 202 exceeds a predetermined reference value (e.g., a size sufficient to store a single image file). When the free space of the buffer memory 202 exceeds the predetermined reference value, the main control unit 108 decides to give a priority to the transfer of the captured image to the communication device 20, and selects the first image transfer method. On the other hand, when the free space of the buffer memory 202 does not exceed the predetermined reference value, the main control unit 108 decides to give a priority to the storage of the captured image on the storage medium. 30, and selects the second image transfer method. The process advances to step S405 when the first image transfer method is selected. The process advances to step S408 when the second image transfer method is selected.

In step S405, the main control unit 108 notifies the network interface 111 and the storage medium interface 107 of the image to be stored on the storage medium. 30 and transferred to the communication device 20. The storage medium interface 107 carries out a process of reading the image file from the second buffer memory 105 and writing the image file to the storage medium 30. The network interface 111, in parallel to this storage process, carries out a process of reading the image file from the second buffer memory 105 and transferring the image file to the communication device 20.

In step S406, the main control unit 108 deletes, from the second buffer memory 105, the image file which was stored on the storage medium 30 and was also transferred to the communication device 20. As a result, the free space in the second buffer memory 105 increases, and the digital image stored on the first buffer memory 102 can be processed.

In step S407, the main control unit 108 decides whether an image file which is not transferred to the communication device 20 exists in the second buffer memory 105. The process returns to step S402 when such an image file exists in the second buffer memory 105. The process according to the flow chart ends when no such image file exists in the second buffer memory 105.

In step S408, the main control unit 108 notifies the storage medium interface 107 of the image file to be stored on the storage medium 30 and to be transferred to the communication device 20. The storage medium interface 107 reads the image file from the second buffer memory 105 and writes the image file on the storage medium 30.

In step S409, the main control unit 108 deletes, from the second buffer memory 105, the image file stored on the storage medium 30. As a result, the free space of the second buffer memory 105 increases, and the digital image stored in the first buffer memory 102 can be processed.

In step S410, if free space is present in the second buffer memory 105, the main control unit 108 instructs the storage medium interface 107 to read the image file in the storage medium 30, which was stored in step S408. The storage media interface 107 reads the image file on the storage media 30, which was stored in step S408, and stores the image file in the second buffer memory 105. The main control unit 108 notifies the network interface 111 of the image file stored in the second buffer memory 105. The network interface 111 reads the image file from the second buffer memory 105 and transfers the image file to the communication device 20.

In step S411, the main control unit 108 deletes, from the second buffer memory 105, the image file transferred to the communication device 20.

In step S412, the main control unit 108 decides whether the image file which is not transferred to the communication device 20 exists in the second buffer memory 105. The process returns to step S402 when such an image file exists in the second buffer memory 105. The process according to the flow chart ends when no such image file exists in the second buffer memory 105.

In step S413, the main control unit 108 decides whether the second image transfer method is turned ON. The process advances to step S408 when the second image transfer method is turned ON. The process advances to step S414 when the second image transfer method is turned OFF.

In step S414, the main control unit 108 notifies the storage medium interface 107 of the image file to be stored to the storage medium 30. The storage medium interface 107 reads the image file from the second buffer memory 105 and writes the image file to the storage medium 30.

In step S415, the main control unit 108 deletes, from the second buffer memory 105, the image file stored on the storage medium 30. As a result, the free space of the second buffer memory 105 increases, and the digital image stored in the first buffer memory 102 can be processed.

In step S416, the main control unit 108 decides whether the image file which is not stored on the storage medium 30 exists in the second buffer memory 105. The process returns to step S402 when such an image file exists in the second buffer memory 105. The process according to the flow chart ends when no such image file exists in the second buffer memory 105.

As described above, according to the image capture device 10 of the first embodiment, the transfer of the captured image to the communication device 20 is given a priority when the first image transfer method is turned ON and the second image transfer method is turned OFF.

Further, according to the image capture device 10 of the first embodiment, the storage of the captured image on the storage medium 30 is given a priority when the first image transfer method is turned OFF and the second image transfer method is turned ON.

Further, according to the image capture device 10 of the first embodiment, if the first and second image transfer methods are turned ON, a priority to the storing of the captured image on the storage medium 30 or a priority to the transfer of the captured image to the communication device 20 can be automatically selected depending on the free space of the buffer memory 202.

Second Embodiment

In the first embodiment, in step S404 of FIG. 4, the first or the second image transfer method is selected depending on the free space of the buffer memory 202. In addition to the free space of the buffer memory 202, the free space of the second buffer memory 105 can also be taken into account. For example, the first image transfer method may be configured to be selected when the free spaces of both the buffer memory 202 and the second buffer memory 105 exceed the predetermined reference values. On the other hand, the second image transfer method may be configured to be selected when the free space of the buffer memory 202 exceeds the predetermined reference value, but the free space of the second buffer memory 105 does not exceed the predetermined reference value.

Further, not only can the free space of the buffer memory 202 be taken into account, but the available capacities of the first buffer memory 102 and the second buffer memory 105 may also be taken into account. For example, the first image transfer method may be configured to be selected when the free space of the buffer memory 202, the first buffer memory 102, and the second buffer memory 105 exceed the predetermined reference value. On the other hand, the second image transfer method may be configured to be selected, even when the free space of the buffer memory 202 exceeds the predetermined reference value, if the free space of the first buffer memory 102 and the second buffer memory 105 do not exceed the predetermined standard value.

Third Embodiment

The process of step S404 of FIG. 4 of the first embodiment can be modified as follows.

In step S404, the main control unit 108 decides whether to select the first image transfer method depending on the remaining amount of charge in the battery connected to the communication device 20. According to the third embodiment, the communication device 20 notifies the image capture device 10 whether the remaining amount of charge in the battery connected to the communication device 20 exceeds a predetermined reference value (e.g., a capacity sufficient to transfer a single image file to the file server 50). When the remaining amount of charge in the battery connected to the communication device 20 exceeds the predetermined reference value, the main control unit 108 decides to give priority to the transfer of the captured image to the communication device 20, and selects the first image transfer method. On the other hand, when the battery connected to the communication device 20 does not exceed the predetermined reference value, the main control unit 108 decides to give priority to the storage of the captured image on the storage medium 30, and selects the second image transfer method. The process advances to step S405 when the first image transfer method is selected. The process advances to step S408 when the second image transfer method is selected.

As described above, according to the image capture device 10 of the third embodiment, the transfer of the captured image to the communication device 20 is given priority when the first image transfer method is turned ON and the second image transfer method is turned OFF.

Further, according to the image capture device 10 of the third embodiment, the storage of the captured image on the storage medium 30 is given a priority when the first image transfer method is turned OFF and the second image transfer method is turned ON.

Further, according to the image capture device 10 of the third embodiment, if the first and second image transfer methods are turned ON, priority to the storage of the captured image on the storage medium 30 or priority to the transfer of the captured image to the communication device 20 can be automatically selected depending on the remaining amount of charge in the battery connected to the communication device 20.

Further, at least one of the first and second embodiments may be combined with the third embodiment.

Fourth Embodiment

In the fourth embodiment, at step S404 of FIG. 4, the first or second image transfer method is selected depending on the remaining amount of charge in the battery connected to the communication device 20. However, the remaining amount of charge in the battery connected to the communication device 20 need not be the only data taken into account. The remaining amount of charge in the battery connected to the image capture device 10 can also be taken into account. For example, the first image transfer method can be configured to be selected when the remaining amounts of charge in the batteries connected to the communication device 20 and the image capture device 10 exceed the predetermined reference values. On the other hand, the second transfer method can be configured to be selected when the remaining amounts of charge in the battery connected to the communication device 20 exceeds the predetermined reference value but the battery connected to the image capture device 10 does not exceed the predetermined reference value.

Further, if power is supplied from the battery connected to the image capture device 10 to the communication device 20, the first or second image transfer method can be configured to be selected depending only on the remaining amount of charge in the battery connected to the image capture device 10.

Further, at least one of the first and second embodiments may be combined with the fourth embodiment.

Fifth Embodiment

The process of step S404 of FIG. 4 in the first embodiment can be modified as follows.

In step S404, the main control unit 108 decides whether to select the first image transfer method depending on a data transfer rate between the image capture device 10 and the communication device 20. According to the fifth embodiment, the data transfer rate between the image capture device 10 and the communication device 20 is detected by the network interface 111. When the data transfer rate between the image capture device 10 and the communication device 20 exceeds a predetermined reference value (e.g., the data transfer rate between the image capture device 10 and the storage medium 30), the main control unit 108 decides to give priority to the transfer of the captured image to the communication device 20, and selects the first image transfer method. On the other hand, when the data transfer rate between the image capture device 10 and the communication device 20 does not exceed the predetermined reference value, the main control unit 108 decides to give priority to the storage of the captured image on the storage medium. 30, and selects the second image transfer method. The process advances to step S405 when the first image transfer method is selected. The process advances to step S408 when the second image transfer method is selected.

As described above, according to the image capture device 10 of the fifth embodiment, the transfer of the captured image to the communication device 20 is given priority when the first image transfer method is turned ON and the second image transfer method is turned OFF.

Further, according to the image capture device 10 of the fifth embodiment, the storage of the captured image on the storage medium 30 is given priority when the first image transfer method is turned OFF and the second image transfer method is turned ON.

Further, according to the image capture device 10 of the fifth embodiment, priority to the storage of the captured image on the storage medium 30 or priority to the transfer of the captured image to the communication device 20 can be automatically selected depending on the data transfer rate between the image capture device 10 and the communication device 20, when the first and second image transfer methods are turned ON.

Further, at least one of the first to fourth embodiments may be combined with the fifth embodiment.

Sixth Embodiment

In the sixth embodiment, in step S404, the first or second image transfer method is configured to be selected depending on the data transfer rate between the image capture device 10 and the communication device 20. However, when a plurality of types of network interfaces connecting the image capture device 10 and the communication device 20 are provided, the network interface types connecting the image capture device 10 and the communication device 20 can be taken into account. For example, when the data transfer rate of the network interface connecting the image capture device 10 and the communication device 20 is faster than the data transfer rate of the storage medium interface 107, the first image transfer method is selected, and the second image transfer method is selected when the data transfer rate of the network interface is slower than the storage medium interface 107.

Further, at least one of the first to fifth embodiments may be combined with the sixth embodiment.

Seventh Embodiment

The process of step S404 of FIG. 4 in the first embodiment can be modified as follows.

In step S404, the main control unit 108 decides whether to select the first image transfer method depending on the data transfer rate between the communication device 20 and the AP 40. In the seventh embodiment, the data transfer rate between the communication device 20 and the AP 40 is detected by the wireless LAN interface 203, and the communication device 20 notifies the image capture device 10 of the transfer rate. When the data transfer rate between the communication device 20 and the AP 40 exceeds a predetermined reference value (e.g., the data transfer rate between the image capture device 10 and the storage medium 30), the main control unit 108 decides to give priority to the transfer of the captured image to the communication device 20, and selects the first image transfer method. On the other hand, when the data transfer rate between the communication device 20 and the AP 40 does not exceed the predetermined reference value, the main control unit 108 decides to give priority to the storage of the captured image on the storage medium 30, and selects the second image transfer method. The process advances to step S405 when the first image transfer method is selected. The process advances to S408 when the second image transfer method is selected.

As described above, according to the image capture device 10 of the seventh embodiment, the transfer of the captured image to the communication device 20 is given priority when the first image transfer method is turned ON and the second image transfer method is turned OFF.

Further, according to the image capture device 10 of the seventh embodiment, the storage of the captured image on the storage medium 30 is given priority when the first image transfer method is turned OFF and the second image transfer method is turned ON.

Further, according to the image capture device 10 of the seventh embodiment, priority to the storage of the captured image on the storage medium 30 or priority to the transfer of the captured image to the communication device 20 can be automatically selected depending on the data transfer rate between the communication device 20 and the AP 40, when the first and second image transfer method are turned ON.

Further, at least one of the first to sixth embodiments can be combined with the seventh embodiment.

Eighth Embodiment

The image capture devices 10 of the first to seventh embodiments are configured to change the image transfer method for every image file transmission when the first and second image transfer methods are turned ON. However, in the eighth embodiment, the image file is divided into a plurality of blocks and the image transfer method for each block is changed.

Other Embodiments

All or part of each of the above embodiments can be implemented by a program executed with a computer such as a microcomputer. In this case, the program can be stored on a storage medium inside a device containing the built-in computer which executes the program, or may be stored on a storage medium attachable to the device containing built-in computer which executes this program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-266898 filed Sep. 14, 2004, which is hereby incorporated by reference herein in its entirety.

What is claimed is:

1. An image capture device, comprising:
an image capture unit that captures an image;
a memory that stores an image file corresponding to the image captured by the image capture unit;
a first interface unit that stores the image file stored in the memory to a storage medium;
a second interface unit that transfers the image file stored in the memory to a communication device; and
a control unit that selects one of a first image transfer method and a second image transfer method based on an amount of charge remaining in a battery connected to the communication device,
wherein if the first image transfer method is selected, the control unit controls the first interface unit to store the image file stored in the memory to the storage medium and controls the second interface unit to transfer the image file stored in the memory to the communication device, and
wherein if the second image transfer method is selected, the control unit controls the first interface unit to store the image file stored in the memory to the storage medium, controls the first interface unit to read the stored image file from the storage medium, and then controls the second interface unit to transfer the read image file to the communication device.

2. The image capture device according to claim 1, wherein the control unit selects the first image transfer method if an amount of charge remaining in the battery connected to the communication device exceeds a predetermined value, and
wherein the control unit selects the second image transfer method if an amount of charge remaining in the battery connected to the communication device does not exceed the predetermined value.

3. The image capture device according to claim 1, wherein the control unit selects the first image transfer method if an amount of charge remaining in the battery connected to the communication device exceeds a predetermined value.

4. The image capture device according to claim 1, wherein the control unit selects the second image transfer method if an amount of charge remaining in the battery connected to the communication device does not exceed a predetermined value.

5. The image capture device according to claim 1, wherein the communication device includes:
a receiving unit that receives the image file that is transferred from the second interface unit; and
a transfer unit that transfers the image file received from the image capture device to an external device.

6. The image capture device according to claim 1, wherein the communication device is a wireless communication device.

7. The image capture device according to claim 1, wherein the image capture device contains the communication device.

8. The image capture device according to claim 1, wherein the communication device is configured to receive power from the battery connected to the communication device.

9. The image capture device according to claim 1, wherein the storage medium is a removable storage medium.

10. The image capture device according to claim 1, wherein the image capture device is configured to act as a digital camera.

11. An image capture device, comprising:
an image capture unit that captures an image;
a memory that stores an image file corresponding to the image captured by the image capture unit;
a first interface unit that stores the image file stored in the memory to a storage medium;
a second interface unit that transfers the image file stored in the memory to a communication device; and
a control unit that selects one of a first image transfer method and a second image transfer method based on at least one of an amount of charge remaining in a battery connected to the communication device and an amount of charge remaining in a battery connected to the image capture device,
wherein if the first image transfer method is selected, the control unit controls the first interface unit to store the image file stored in the memory to the storage medium and controls the second interface unit to transfer the image file stored in the memory to the communication device, and wherein if the second image transfer method is selected, the control unit controls the first interface unit to store the image file stored in the memory to the storage medium, controls the first interface unit to read the stored image file from the storage medium, and then controls the second interface unit to transfer the read image file to the communication device.

12. The image capture device according to claim 11, wherein the control unit selects the first image transfer method if an amount of charge remaining in the battery connected to the communication device exceeds a predetermined value and an amount of charge remaining in the battery connected to the image capture device exceeds a predetermined value.

13. The image capture device according to claim 11, wherein the control unit selects the second image transfer method if an amount of charge remaining in the battery connected to the communication device exceeds a predetermined value and an amount of charge remaining in the battery connected to the image capture device does not exceed a predetermined value.

14. The image capture device according to claim 11, wherein the communication device includes:
a receiving unit that receives the image file that is transferred from the second interface unit; and
a transfer unit that transfers the image file received from the image capture device to an external device.

15. The image capture device according to claim 11, wherein the communication device is a wireless communication device.

16. The image capture device according to claim 11, wherein the image capture device contains the communication device.

17. The image capture device according to claim 11, wherein the image capture device is configured to supply power to the communication device.

18. The image capture device according to claim 11, wherein the storage medium is a removable storage medium.

19. The image capture device according to claim 11, wherein the image capture device is configured to act as a digital camera.

20. A method comprising:
storing an image file, which corresponds to an image captured by an image capture unit of an image capture device, in a memory;
storing the image file stored in the memory to a storage medium via a first interface unit of the image capture device;
transferring the image file stored in the memory to a communication device via a second interface unit of the image capture device; and
selecting one of a first image transfer method and a second image transfer method based on an amount of charge remaining in a battery connected to the communication device,
wherein if the first image transfer method is selected, the image file stored in the memory is stored in the storage medium via the first interface unit and the image file stored in the memory is transferred to the communication device via the second interface unit, and
wherein if the second image transfer method is selected, the image file stored in the memory is stored in the storage medium via the first interface unit, the stored image file is read from the storage medium via the first interface unit, and then the read image file is transferred to the communication device via the second interface unit.

21. The method according to claim 20, wherein the first image transfer method is selected if an amount of charge remaining in the battery connected to the communication device exceeds a predetermined value, and
wherein the second image transfer method is selected if an amount of charge remaining in the battery connected to the communication device does not exceed the predetermined value.

22. The method according to claim 20, wherein the first image transfer method is selected if an amount of charge remaining in the battery connected to the communication device exceeds a predetermined value.

23. The method according to claim 20, wherein the second image transfer method is selected if an amount of charge remaining in the battery connected to the communication device does not exceed a predetermined value.

24. The method according to claim 20, wherein the communication device includes:
a receiving unit that receives the image file that is transferred from the second interface unit; and
a transfer unit that transfers the image file received from the image capture device to an external device.

25. The method according to claim 20, wherein the communication device is a wireless communication device.

26. The method according to claim 20, wherein the image capture device contains the communication device.

27. The method according to claim 20, wherein the communication device is configured to receive power from the battery connected to the communication device.

28. The method according to claim 20, wherein the storage medium is a removable storage medium.

29. The method according to claim 20, wherein the image capture device is configured to act as a digital camera.

30. A method comprising:
storing an image file, which corresponds to an image captured by an image capture unit of an image capture device, in a memory;
storing the image file stored in the memory to a storage medium via a first interface unit of the image capture device;
transferring the image file stored in the memory to a communication device via a second interface unit of the image capture device; and
selecting one of a first image transfer method and a second image transfer method based on at least one of an amount of charge remaining in a battery connected to the communication device and an amount of charge remaining in a battery connected to the image capture device,
wherein if the first image transfer method is selected, the image file stored in the memory is stored in the storage medium via the first interface unit and the image file stored in the memory is transferred to the communication device via the second interface unit, and
wherein if the second image transfer method is selected, the image file stored in the memory is stored in the storage medium via the first interface unit, the stored image file is read from the storage medium via the first interface unit, and then the read image file is transferred to the communication device via the second interface unit.

31. The method according to claim 30, wherein the first image transfer method is selected if an amount of charge remaining in the battery connected to the communication device exceeds a predetermined value and an amount of charge remaining in the battery connected to the image capture device exceeds a predetermined value.

32. The method according to claim 30, wherein the second image transfer method is selected if an amount of charge remaining in the battery connected to the communication device exceeds a predetermined value and an amount of charge remaining in the battery connected to the image capture device does not exceed a predetermined value.

33. The method according to claim 30, wherein the communication device includes:
   a receiving unit that receives the image file that is transferred from the second interface unit; and
   a transfer unit that transfers the image file received from the image capture device to an external device.

34. The method according to claim 30, wherein the communication device is a wireless communication device.

35. The method according to claim 30, wherein the image capture device contains the communication device.

36. The method according to claim 30, wherein the image capture device is configured to supply power to the communication device.

37. The method according to claim 30, wherein the storage medium is a removable storage medium.

38. The method according to claim 30, wherein the image capture device is configured to act as a digital camera.

\* \* \* \* \*